(12) United States Patent
Whitcomb

(10) Patent No.: US 8,706,803 B1
(45) Date of Patent: Apr. 22, 2014

(54) CLIENT-SIDE GENERATION OF PRELIMINARY VERSION OF NETWORK PAGE

(75) Inventor: Thomas William Whitcomb, Sherman Oaks, CA (US)

(73) Assignee: IMDb.com, Inc., Seattle, WA (US)

( * ) Notice: Subject to any disclaimer, the term of this patent is extended or adjusted under 35 U.S.C. 154(b) by 769 days.

(21) Appl. No.: 12/889,858

(22) Filed: Sep. 24, 2010

(51) Int. Cl.
*G06F 15/16* (2006.01)
*G06F 3/00* (2006.01)

(52) U.S. Cl.
USPC .......................... 709/203; 715/744

(58) Field of Classification Search
USPC ................... 709/223, 203; 715/744
See application file for complete search history.

(56) References Cited

U.S. PATENT DOCUMENTS

| | | | | |
|---|---|---|---|---|
| 6,173,322 B1 * | 1/2001 | Hu | ................................. | 709/224 |
| 6,199,107 B1 * | 3/2001 | Dujari | ........................... | 709/219 |
| 6,973,626 B1 * | 12/2005 | Lahti et al. | ..................... | 715/763 |
| 7,107,543 B2 * | 9/2006 | Berry et al. | ..................... | 715/749 |
| 7,480,867 B1 * | 1/2009 | Racine et al. | .................. | 715/744 |
| 7,953,861 B2 * | 5/2011 | Yardley | ........................... | 709/227 |
| 8,108,488 B2 * | 1/2012 | Derechin et al. | .............. | 709/219 |
| 8,266,202 B1 * | 9/2012 | Colton et al. | .................. | 709/203 |
| 2002/0116708 A1 * | 8/2002 | Morris et al. | .................... | 725/37 |
| 2003/0009488 A1 * | 1/2003 | Hart, III | ......................... | 707/500 |
| 2003/0023641 A1 * | 1/2003 | Gorman et al. | ................ | 707/530 |
| 2007/0061486 A1 * | 3/2007 | Trinh et al. | ..................... | 709/246 |
| 2007/0061700 A1 * | 3/2007 | Kothari et al. | ................ | 715/505 |
| 2007/0088805 A1 * | 4/2007 | Cyster | ........................... | 709/217 |
| 2007/0143672 A1 * | 6/2007 | Lipton et al. | ................... | 715/530 |
| 2008/0141116 A1 * | 6/2008 | Mohan | ........................... | 715/236 |

OTHER PUBLICATIONS

Pilgrim; "Dive Into HTML5", http://web.archive.org/web/20100619220202/http://diveintohtml5.org/ (archived Jun. 19, 2010).
Pilgrim; "Dive Into HTML5", http://www.diveintohtml5.org.

* cited by examiner

*Primary Examiner* — Lance L Barry
(74) *Attorney, Agent, or Firm* — Thomas | Horstemeyer, LLP

(57) ABSTRACT

Disclosed are various embodiments that facilitate client-side network page generation. A request for a network page is obtained from a client computing device in one or more computing devices. Network page generation code for generating the network page is sent to the client computing device in response to the request and in place of the network page. The network page generation code is executable within a local application that is executed in the client computing device. The network page generation code includes code that obtains multiple data elements from the one or more computing devices. The network page generation code also includes code that generates a network page. The data elements are included within the network page.

23 Claims, 4 Drawing Sheets

CLIENT-SIDE GENERATION OF PRELIMINARY VERSION OF NETWORK PAGE

BACKGROUND

Although network pages, such as web pages, may be maintained as static files in a data store, network pages are now almost exclusively generated dynamically. Data from potentially many sources are aggregated together by an application that generates network pages. Dynamic network page generation may allow for greater flexibility for the developers of a network site and may deliver a customized experience for end users. However, hardware requirements for network page servers have increased commensurately with the increased processing demands associated with dynamically generated network pages.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating the generation of network pages on the client side. Dynamically generated network pages have become increasingly complex, thereby placing significant resource demands on network page servers. Often, a network page generation application that executes on a server must gather data elements from a variety of sources and concatenate those data elements together with hypertext markup language (HTML) and/or other data to generate the network page. Although server-side caching may be employed, often the network page is regenerated for each request. Various embodiments of the present disclosure provide a more scalable architecture by off-loading network page generation functions to clients. In many instances, client devices may have substantial available resources to perform such processing as network page generation. Along with reducing load on servers, client-side network page generation may also result in reduced network bandwidth consumption.

In the following discussion, a general description of the system and its components is provided, followed by a discussion of the operation of the same.

Figure 1:
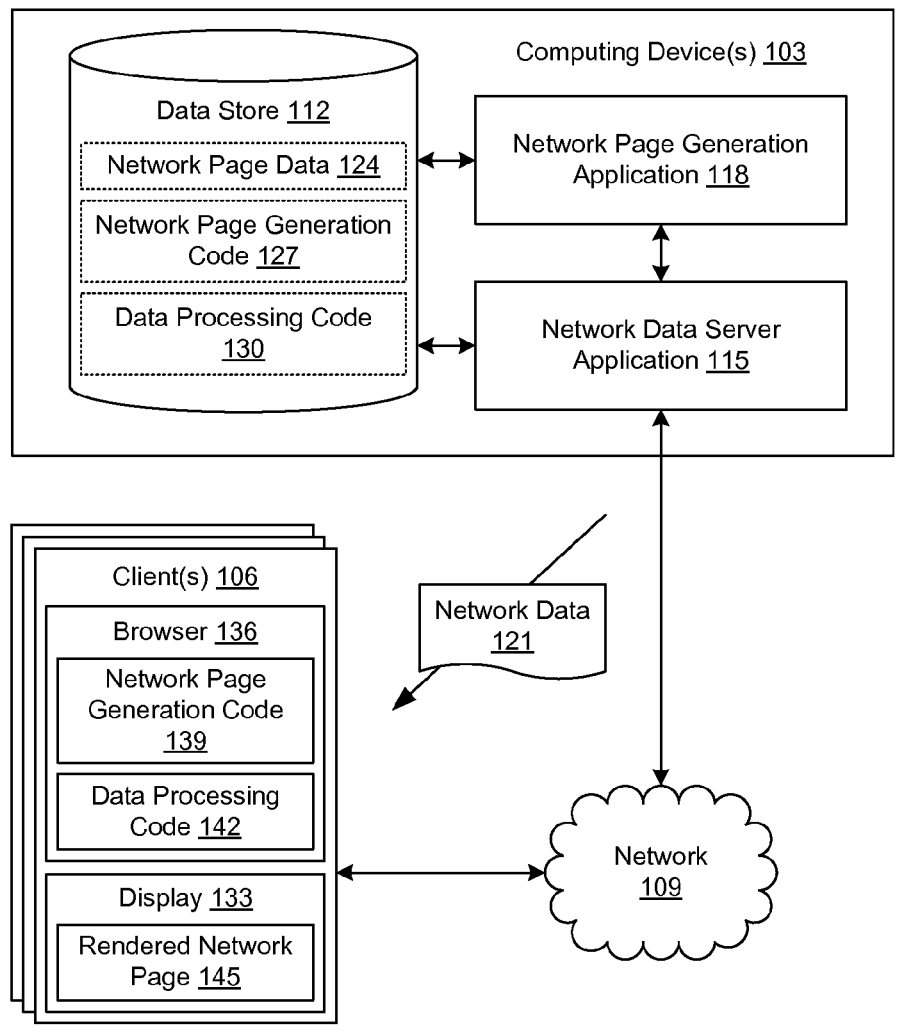
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a network data server application 115, a network page generation application 118, and other applications, services, processes, systems, engines, or functionality not discussed in detail herein. The network data server application 115 is executed to receive requests for data from a client 106 and to respond by returning the requested data from the data store 112. The requested data is sent to the client 106 as network data 121 over the network 109. In various embodiments, the network data server application 115 may comprise a commercially available hypertext transfer protocol (HTTP) server application such as, for example, Apache® HTTP Server, Apache® Tomcat®, Microsoft® Internet Information Services (IIS), and others.

The network page generation application 118 is executed to generate network pages, such as web pages, that are not configured to be generated in a client 106. Such network pages may correspond to those that are, for example, compatible with caching, updated relatively infrequently, not customer dependent, or otherwise benefit less from client-side generation. The network data server application 115, which may include caching functionality for such network pages, may be configured to send the network pages that have been generated by the network page generation application 118 to the client 106.

The data stored in the data store 112 includes, for example, network page data 124, network page generation code 127, data processing code 130, and potentially other data. The network page data 124 may include static network pages, data used in generating dynamic network pages, templates, graphics, images, audio, video, multimedia, animations, and/or other data related to network pages. The network page generation code 127 includes code that is configured to generate network pages in a client 106. To this end, the network page generation code 127 may include JavaScript, VBScript, ActiveX controls, Java, and/or other code that may be executed in a client 106.

The network pages that are generated may include, for example, extensible markup language, HTML, and/or other markup. The network page generation code 127 may be configured to generate network pages that include HTML5 and/or other versions. Such network pages may include HTML5 features such as video, local storage, web workers, offline web applications, geolocation, HTML5 input types, placeholder text, form autofocus, microdata, and/or other features.

The data processing code 130 includes code that processes data for inclusion in a network page by the network page generation code 127. In addition, the data processing code 130 may be configured to transform data supplied by a user for transmission to the network data server application 115. The data processing code 130 may facilitate encryption and/or decryption of data, encoding of data, image manipulation and generation, and/or any other processing or transformation that may be applied to data related to network pages. The data processing code 130 may further include business logic, business rules, workflows, and/or other code that handles data exchange between the data store 112 and a user interface.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, smart phones, set-top boxes, music players, web pads, tablet computer systems, game consoles, electronic book readers, or other devices with like capability. The client 106 may include a display 133. The display 133 may comprise, for example, one or more devices such as cathode ray tubes (CRTs), liquid crystal display (LCD) screens, gas plasma-based flat panel displays, LCD projectors or other types of display devices, etc.

The client 106 may be configured to execute various applications such as a browser 136 and/or other applications. The browser 136 may be executed in a client 106, for example, to access and render network pages, such as web pages, or other network content served up by the computing device 103 and/or other servers. The browser 136 may be further configured to obtain the network page generation code 139 and data processing code 142 from the network data server application 115 executed on the computing devices 103. The browser 136 may further be configured to execute the network page generation code 139 and/or the data processing code 142 to generate rendered network pages 145 to be shown on the display 133. The client 106 may be configured to execute applications beyond the browser 136 such as, for example, email applications, instant message applications, and/or other applications.

Next, a general description of the operation of the various components of the networked environment 100 is provided. To begin, a user at a client 106 enters a uniform resource locator (URL) into a browser 136. Alternatively, the user may select a link within a rendered network page 145. Accordingly, a request for a network page may be sent over the network 109 to the network data server application 115.

The network data server application 115 determines whether the request can be satisfied from a static network page stored in the network page data 124 in the data store 112. If the request may be satisfied by returning a static network page, the static network page is returned as the network data 121 by the network data server application 115. Additionally, the network data server application 115 determines whether the request may be satisfied by a network page generated on the computing device 103. As non-limiting examples, the network page generation application 118 may be configured to generate network pages that, for example, are rather simple, do not involve high resource demands on the computing device 103, etc. If the network page generation application 118 is configured to generate the network page, the network data server application 115 obtains the generated network page from the network page generation application 118 and returns the network page as the network data 121 over the network 109 to the client 106.

Where the requested network page is a dynamic network page and generating the dynamic network page is resource intensive for the computing device 103, the network data server application 115 may be configured to return network page generation code 127 in place of a network page. The network page generation code 127 may then be executed in the browser 136 in the client 106 as the network page generation code 139. The network page generation code 139 may be configured to obtain one or more data elements from the network data server application 115 in order to generate the rendered network page 145.

Such data elements may include, for example, text strings, graphics, images, audio, video, multimedia, and/or any other data element that may be used in forming a rendered network page 145. The network page generation code 139 obtains the data elements as network data 121 over the network 109. To this end, the network data 121 may include the data elements encoded in a serialization format. Non-limiting examples of serialization formats may include, for example, extensible markup language (XML), JavaScript object notation (JSON), yet another markup language (YAML), and/or other serialization formats.

Upon receiving the network data 121, including the data elements for use in generating the rendered network page 145, the network page generation code 139 proceeds to generate the rendered network page 145 by processing the data elements. Such processing may involve concatenating HTML and/or other markup code with the data elements. In some cases, data processing code 142 may be invoked to further process one or more of the data elements before they are used in generating the rendered network page 145. As a non-limiting example, a data element may be encrypted for transmission over the network 109. Accordingly, the data processing code 142 may be invoked to decrypt the data element to place it in an appropriate format for inclusion within the rendered network page 145. As a non-limiting example, multiple data elements may be used as inputs to the data processing code 142, which may, in some cases, output a different number of data elements.

As a non-limiting example, the data processing code 142 may correspond to code for performing any resource intensive processing on data elements for use in generating rendered network pages 145. However, it may be desirable not to send certain data processing code 142 to a client 106. For example, certain data processing code 142 may correspond to proprietary code, secured code, and/or any other code that the operator of the computing device 103 may not wish to release to the public. In such an example, the network page generation application 118 on the computing device 103 may be employed to perform the required transformations and/or processing of data elements.

In various embodiments, the client 106 may correspond to a mobile computing device. Such a device may include, for example, a smart phone, a personal digital assistant, an electronic book reader, or any other type of mobile computing device. Client-side network page generation may offer several advantages for mobile computing devices. For example, connectivity to the network 109 may be more likely to be interrupted on a mobile computing device than for clients 106 that are associated with fixed locations and/or wired network 109 connections. Thus, it may be advantageous for the network page generation code 139 on a client 106 that corresponds to a mobile computing device to be capable of generating preliminary versions of rendered network pages 145 while waiting for the data elements that are required to generate the rendered network pages 145.

For example, after the network page generation code 139 is obtained, the connectivity between the client 106 and the computing device 103 may be interrupted. Consequently, it may be the case that not all of the required data elements have been obtained for generating the rendered network page 145. In such a case, the network page generation code 139 may generate a preliminary version of the rendered network page 145. The network page generation code 139 may employ HTML5 features such as, for example, offline web applications and/or other features to handle interrupted connectivity. After connectivity through the network 109 is restored, the network page generation code 139 may be configured to update the rendered network page 145 to another intermediate version or to the final version.

In addition, the network page generation code 139 may be configured to generate the rendered network page 145 in a special format for characteristics of the client 106. For example, when the client 106 corresponds to a mobile computing device, the display 133 may have a smaller size than a display 133 typically associated with a client 106 maintained in a fixed location. Further, the input devices associated with such a client 106 may be limited relative to other types of clients 106. As a non-limiting example, the client 106 may have a touch screen as a display 133 but not a standard keyboard or mouse. The network page generation code 139 may be configured to format the rendered network page 145 considering some or all of these characteristics.

Various embodiments of the network page generation code 139 may be cached in the browser 136. For example, the network page generation code 139 may comprise a browser 136 plug-in that is permanently or temporarily installed in the browser 136. Accordingly, the network page generation code 139 may be used to regenerate the same rendered network page 145 or to generate multiple different rendered network pages 145 depending upon data elements that are obtained from the network data server application 115. As a non-limiting example, one instance of network page generation code 139 may correspond to all of the network page generation code 139 necessary to generate rendered network pages 145 for a network site.

Figure 2:
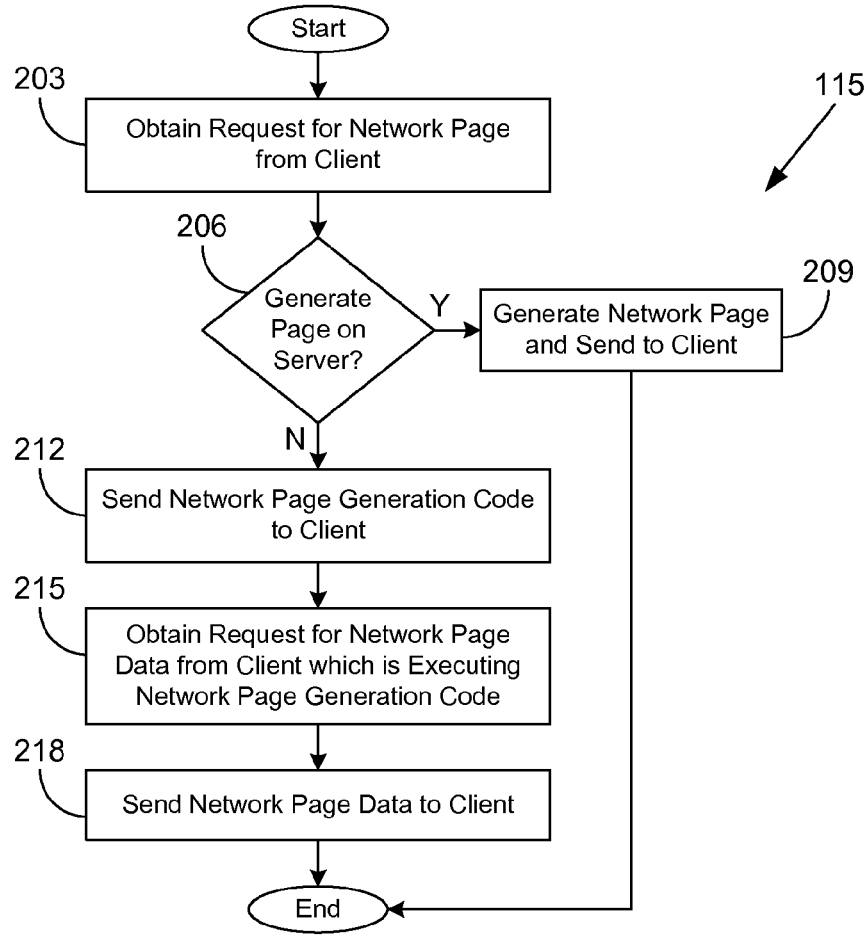
FIG. 2 is a flowchart illustrating one example of functionality implemented as portions of a network data server application executed in a computing device in the networked environment of FIG. 1 according to various embodiments of the present disclosure.

Referring next to FIG. 2, shown is a flowchart that provides one example of the operation of a portion of the network data server application 115 according to various embodiments. It is understood that the flowchart of FIG. 2 provides merely an example of the many different types of functional arrangements that may be employed to implement the operation of the portion of the network data server application 115 as described herein. As an alternative, the flowchart of FIG. 2 may be viewed as depicting an example method implemented in the computing device 103 (FIG. 1) according to one or more embodiments.

Beginning with box 203, the network data server application 115 obtains a request for a network page from a client 106 (FIG. 1). In box 206, the network data server application 115 determines whether the requested network page is to be generated on the server, i.e., the computing device 103. If the network page is to be generated on the computing device 103, the network data server application 115 moves to box 209 and generates the network page and sends the generated network page to the client 106.

In one non-limiting example, the network data server application 115 may obtain a generated network page from the network page generation application 118 (FIG. 1). In another non-limiting example, the network data server application 115 may simply read a static network page from the data store 112 (FIG. 1). In any event, the network page is sent to the client 106 for rendering. Thereafter, the portion of the network data server application 115 ends.

If the network data server application 115 instead determines in box 206 that the network page that is requested is not to be generated on the computing device 103, the network data server application 115 proceeds to box 212 and sends applicable network page generation code 127 (FIG. 1) to the client 106. Where the network page generation code 127 is currently cached in the client 106 as network page generation code 139 (FIG. 1), the network data server application 115 may be configured not to resend the network page generation code 127. In various embodiments, the network data server application 115 may also be configured to send data processing code 142 (FIG. 1) to the client 106 such as cryptographic code, business logic, etc.

Subsequently, in box 215, the network data server application 115 obtains a request for network page data 124 (FIG. 1) corresponding to one or more data elements to be used in generating a rendered network page 145 (FIG. 1). The request is obtained from the client 106 which is executing the network page generation code 139. Next, in box 218, the network data server application 115 sends the applicable network page data 124 to the client 106 as network data 121 (FIG. 1). Thereafter, the portion of the network data server application 115 ends.

Figure 3:
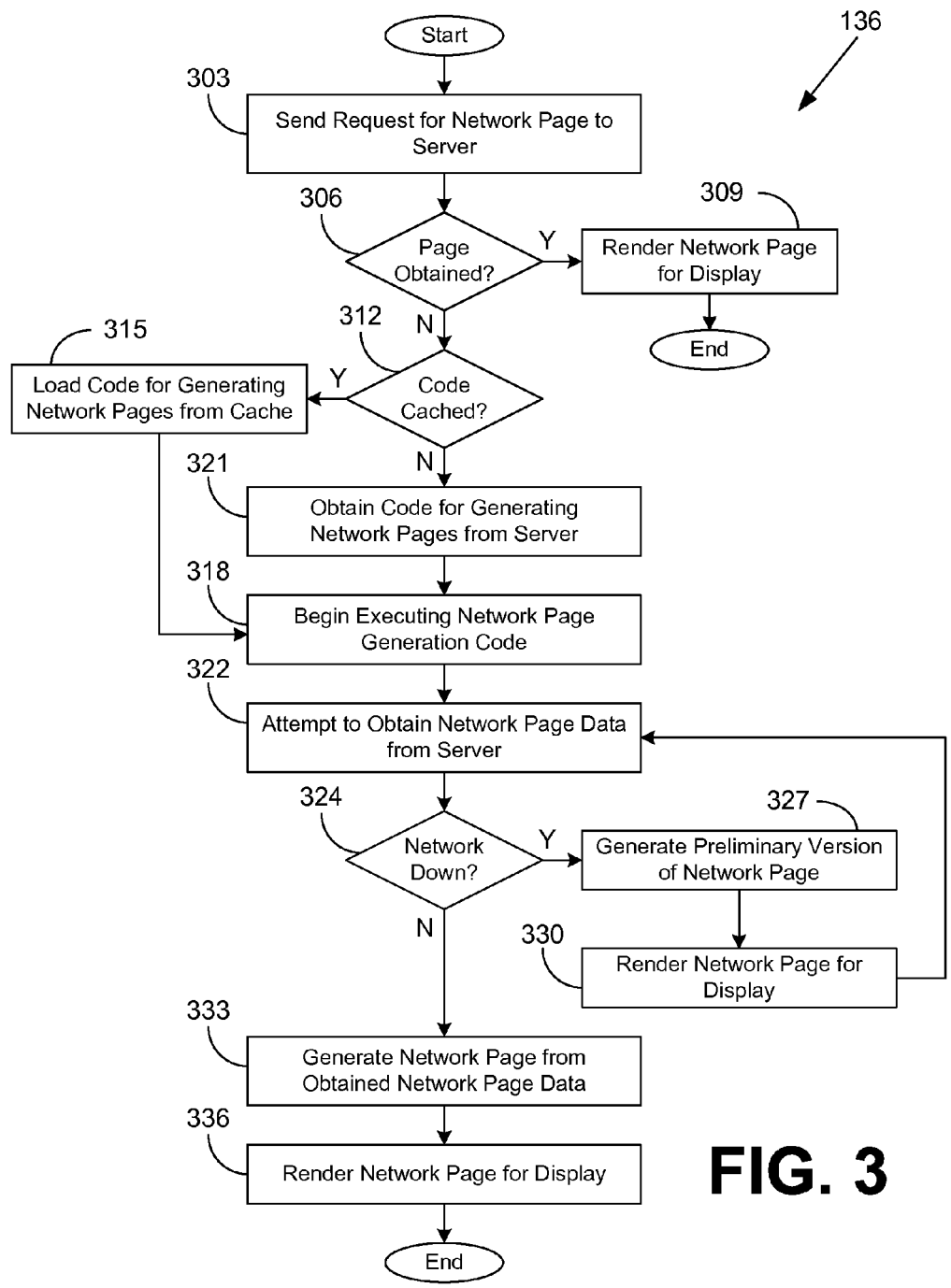
FIG. 3 is a flowchart illustrating one example of functionality implemented as portions of a browser executed in a client in the networked environment of FIG. 1 according to various embodiments of the present disclosure.

Moving on to FIG. 3, shown is a flowchart that provides one example of the operation of a portion of the browser 136 in implementing an executable portion of a network page according to various embodiments. It is understood that the flowchart of FIG. 3 provides merely an example of the many different types of functional arrangements that may be employed to implement the operation of the portion of the browser 136 as described herein. As an alternative, the flowchart of FIG. 3 may be viewed as depicting an example method implemented in the computing device 103 (FIG. 1) according to one or more embodiments.

Beginning with box 303, the browser 136 sends a request for a network page to the network data server application 115 (FIG. 1) executed in the computing device 103. In box 306, the browser 136 determines whether a network page has been obtained in the network data 121 (FIG. 1) from the computing device 103 in response to the request. If the browser 136 determines in box 306 that a network page has been obtained, the browser 136 renders the network page for display in box 309 as a rendered network page 145 (FIG. 1). Thereafter, the portion of the browser 136 ends.

If, instead, in box 306, the browser 136 determines that a network page has not been obtained in the network data 121, the browser 136 proceeds to box 312. In box 312, the browser 136 determines whether the network page generation code 139 (FIG. 1) associated with the requested network page has been cached in the browser 136. If the browser 136 determines in box 312 that the network page generation code 139 has been cached, the browser 136 transitions to box 315 and loads the network page generation code 139 for generating network pages from the cache. Thereafter, the browser 136 proceeds to box 318. If, instead, the browser 136 determines in box 312 that the network page generation code 139 is not cached in the client 106, the browser 136 moves to box 321 and obtains the network page generation code 139 for generating the network pages from the network data server application 115. The browser 136 may also obtain data processing code 142 (FIG. 1) along with the network page generation code 139 in some embodiments.

Next, the browser 136 proceeds to box 318. In box 318, the browser 136 begins executing the network page generation code 139. In box 322, the browser 136 attempts to obtain the network page data 124 (FIG. 1) from the network data server application 115 executed in the computing device 103. In box 324, the browser 136 determines whether the network 109 (FIG. 1) is down or whether the connection through the network 109 has been interrupted in any way while attempting to obtain the network page data 124. If the browser 136 determines in box 324 that the network 109 is down, the browser 136 proceeds to box 327 and generates a preliminary version of the network page using the network page generation code 139. In box 330, the browser 136 renders the network page for display as the rendered network page 145. Subsequently, the browser 136 returns to box 322 and again attempts to obtain the rest of the network page data 124 from the network data server application 115.

If, in box 324, the browser 136 determines that the network 109 has not gone down and the network page data 124 has been obtained, the browser 136 transitions to box 333 and generates the network page from the obtained network page data 124 using the network page generation code 139. The browser 136 may also execute the data processing code 142 to execute cryptographic functions, business logic, business rules, workflows, etc. In box 336, the browser 136 renders the network page for display as the rendered network page 145. Thereafter, the portion of the browser 136 ends.

Figure 4:
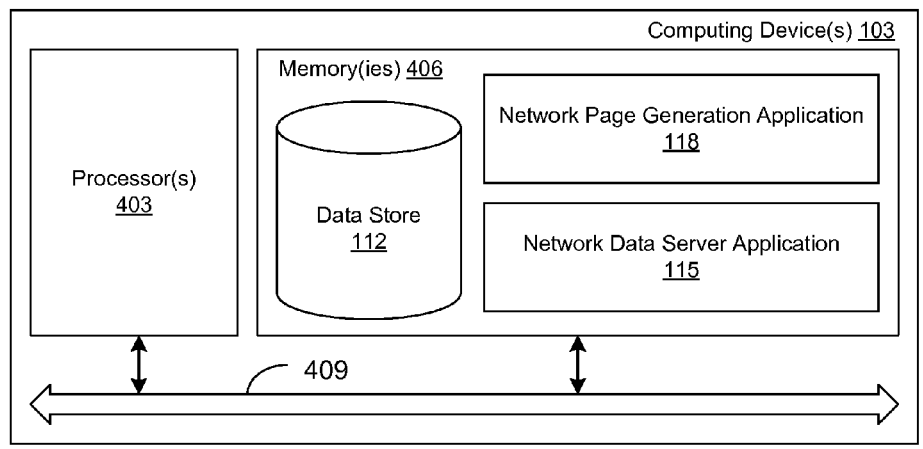
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network data server application 115, the network page generation application 118, and potentially other applications. Also stored in the memory 406 may be a data store 112 and other data. In addition, an operating system may be stored in the memory 406 and executable by the processor 403.

Figure 5:
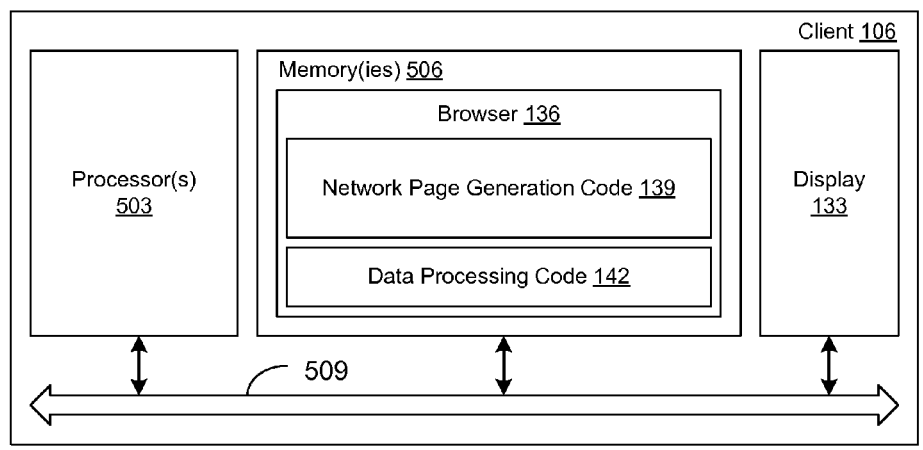
FIG. 5 is a schematic block diagram that provides one example illustration of a client employed in the networked environment of FIG. 1 according to various embodiments of the present disclosure.

Referring next to FIG. 5, shown is a schematic block diagram of the client 106 according to an embodiment of the present disclosure. The client 106 includes at least one processor circuit, for example, having a processor 503 and a memory 506, and a display 133, which are all coupled to a local interface 509. The local interface 509 may comprise, for example, a data bus with an accompanying address/control bus or other bus structure as can be appreciated. The client 106 may also include various peripheral devices coupled to the local interface 509. In particular, peripheral devices may include input devices, for example, a keyboard, keypad, touch pad, touch screen, microphone, scanner, mouse, joystick, or one or more push buttons, etc. The peripheral devices may also include indicator lights, speakers, printers, etc.

Stored in the memory 506 are both data and several components that are executable by the processor 503. In particular, stored in the memory 506 and executable by the processor 503 are the browser 136, the network page generation code 139, the data processing code 142, and potentially other applications. In addition, an operating system may be stored in the memory 406 and executable by the processor 403.

Referring now to both FIGS. 4 and 5, it is understood that there may be other applications that are stored in the memories 406, 506 and are executable by the processors 403, 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memories 406, 506 and are executable by the respective processors 403, 503. In this respect, the term "executable" means a program file that is in a form that can ultimately be run by the processors 403, 503. Examples of executable programs may be, for example, a compiled program that can be translated into machine code in a format that can be loaded into a random access portion of the memories 406, 506 and run by the respective processors 403, 503, source code that may be expressed in proper format such as object code that is capable of being loaded into a random access portion of the memories 406, 506 and executed by the respective processors 403, 503, or source code that may be interpreted by another executable program to generate instructions in a random access portion of the memories 406, 506 to be executed by the respective processors 403, 503, etc. An executable program may be stored in any portion or component of the memories 406, 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 406, 506 are defined herein as including both volatile and nonvolatile memory and data storage components. Volatile components are those that do not retain data values upon loss of power. Nonvolatile components are those that retain data upon a loss of power. Thus, the memories 406, 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 403, 503 may represent multiple processors 403, 503 and each memory 406, 506 may represent multiple memories 406, 506 that operate in parallel processing circuits, respectively. In such a case, the respective local interface 409, 509 may be an appropriate network 109 (FIG. 1) that facilitates communication between any two of the multiple processors 403, 503, between any processor 403, 503 and any of the respective memories 406, 506, or between any two of the respective memories 406, 506, etc. The local interfaces 409, 509 may comprise additional systems designed to coordinate this communication, including, for example, performing load balancing. The processors 403, 503 may be of electrical or of some other available construction.

Although the network data server application 115, the network page generation application 118, the browser 136, the network page generation code 139, the data processing code 142, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the network data server application 115 and the browser 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403, 503 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network data server application 115, the network page generation application 118, the browser 136, the network page generation code 139, and the data processing code 142, that comprises software or code can be embodied in any non-transitory computer-readable medium for use by or in connection with an instruction execution system such as, for example, a processor 403, 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program comprising:

code that obtains a request for a network page from a mobile computing device;

code that sends network page generation code to the mobile computing device in response to the request and in place of the network page; and wherein the network page generation code is configured to be executed in a browser application in the mobile computing device, and the network page generation code comprises:

code that attempts to obtain a plurality of data elements from the at least one computing device, the plurality of data elements being expressed in a data serialization format;

code that renders a preliminary version of the network page when a connection to the at least one computing device is interrupted before obtaining all of the plurality of data elements; and code that renders the network page, the network page comprising a concatenation of at least some of the plurality of data elements with hypertext markup language (HTML).

2. The non-transitory computer-readable medium of claim 1, wherein the network page generation code is configured to render network page and the preliminary version of the network page to be specially formatted for the mobile computing device.

3. The non-transitory computer-readable medium of claim 1, wherein the network page generation code further comprises code that updates the preliminary version of the network page when at least one of the plurality of data elements is obtained from the at least one computing device.

4. A system, comprising:

at least one computing device; and a network data server application executable in the at least one computing device, the network data server application comprising:

logic that obtains a request for a network page from a client computing device; and logic that sends network page generation code for generating the network page to the client computing device in response to the request and in place of the network page, the network page generation code being executable within a local application that is executed in the client computing device, the network page generation code comprising:

code that obtains a plurality of data elements from the at least one computing device;

code that generates a preliminary version of the network page when network connectivity of the client computing device to the at least one computing device is interrupted before the data elements are fully obtained; and code that generates the network page, the plurality of data elements being included within the network page.

5. The system of claim 4, wherein the network data server application further comprises:

logic that obtains a request for at least one of the plurality of data elements from the client computing device; and logic that sends the at least one of the plurality of data elements to the client computing device.

6. The system of claim 4, wherein the local application comprises a browser application.

7. The system of claim 4, wherein the network page generation code comprises a browser plug-in application, and the network page generation code is configured to generate a plurality of different network pages.

8. The system of claim 4, wherein the code that generates the network page is configured to generate a hypertext markup language (HTML) file for rendering by the local application in the client computing device.

9. The system of claim 4, wherein the logic that sends the network page generation code is further configured to send data processing code to the client computing device, the data processing code being configured to transform at least one of the plurality of data elements into a different data element, the different data element being included in the network page.

10. The system of claim 9, wherein the data processing code is configured to perform a cryptographic function on the at least one of the plurality of data elements.

11. The system of claim 4, wherein the logic that sends the network page generation code is further configured to send data processing code to the client computing device, the data processing code being configured to transform at least one user-provided data element into a different data element for transmission to the at least one computing device.

12. The system of claim 4, wherein the network data server application further comprises:

logic that determines whether the network page corresponds to a static network page;

logic that loads the static network page from a data store;

logic that sends the static network page to the client computing device when the network page corresponds to the static network page; and wherein the logic that sends the network page generation code is configured not to send the network page generation code when the network page corresponds to the static network page.

13. A method, comprising:

sending, in a client computing device, a request for a network page to at least one computing device;

obtaining, in the client computing device, network page generation code from the at least one computing device in response to the request and in place of the network page; and executing, in the client computing device, the network page generation code, which further comprises:

obtaining, in the client computing device, a plurality of data elements from the at least one computing device;

when network connectivity to the at least one computing device is interrupted before the data elements are fully obtained, generating a preliminary version of the network page in the client computing device; and when the network connectivity to the at least one computing device is not interrupted before the data elements are fully obtained, generating, in the client computing device, the network page, the data elements being included in the network page.

14. The method of claim 13, wherein generating the network page further comprises concatenating, in the client computing device, the plurality of data elements with hypertext markup language (HTML) formatting.

15. The method of claim 13, wherein the plurality of data elements are obtained with the network page generation code from the at least one computing device in response to the request.

16. The method of claim 13, wherein obtaining the data elements further comprises decoding, in the client computing device, the plurality of data elements from a serialization format.

17. The method of claim 16, wherein the serialization format is selected from the group consisting of: extensible markup language (XML), JavaScript object notation (JSON), and yet another markup language (YAML).

18. The method of claim 13, further comprising rendering the network page on a display of the client computing device.

19. The method of claim 13, further comprising storing the network page generation code in a cache in the client computing device.

20. The method of claim 13, wherein executing the network page generation code further comprises generating, in the client computing device, another network page, at least one of the plurality of data elements being included in the another network page.

21. The method of claim 13, wherein the client computing device comprises a mobile device.

22. The method of claim 13, wherein executing the network page generation code further comprises, when network connectivity to the at least one computing device is restored after being interrupted, obtaining, in the client computing device, at least one of the plurality of data elements from the at least one computing device.

23. The method of claim 22, wherein executing the network page generation code further comprises, when network connectivity to the at least one computing device is restored after being interrupted, generating, in the client computing device, the network page, the plurality of data elements being included in the network page.

* * * * *